(12) United States Patent
Steimle et al.

(10) Patent No.: US 6,377,941 B1
(45) Date of Patent: Apr. 23, 2002

(54) IMPLEMENTING AUTOMATIC LEARNING ACCORDING TO THE K NEAREST NEIGHBOR MODE IN ARTIFICIAL NEURAL NETWORKS

(75) Inventors: Andre Steimle, Evry; Pascal Tannhof, Cely-en-Biere, both of (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,450

(22) Filed: Jun. 22, 1999

(30) Foreign Application Priority Data

Nov. 26, 1998 (EP) .............................. 98480082

(51) Int. Cl.[7] .............................. G06F 15/18

(52) U.S. Cl. ....................................... 706/26

(58) Field of Search ............... 706/27, 33, 41, 706/26, 37, 38

(56) References Cited

U.S. PATENT DOCUMENTS

| | | | | |
|---|---|---|---|---|
| 5,131,072 A | * | 7/1992 | Yoshizawa et al. | 706/38 |
| 5,142,666 A | * | 8/1992 | Yoshizawa et al. | 706/38 |
| 5,216,746 A | * | 6/1993 | Yoshizawa et al. | 706/37 |
| 5,220,559 A | * | 6/1993 | Tsuzuki et al. | 706/37 |
| 5,621,863 A | * | 4/1997 | Boulet et al. | 706/26 |
| 5,701,397 A | * | 12/1997 | Steimle et al. | 706/41 |
| 5,710,869 A | * | 1/1998 | Godefroy et al. | 706/41 |
| 5,717,832 A | * | 2/1998 | Steimle et al. | 706/33 |
| 5,740,326 A | * | 4/1998 | Boulet et al. | 706/27 |

OTHER PUBLICATIONS

An Analysis of the Destabilizing Effect of Daisy Chained Rate–Limited Actuators, Jordan M. Berg, Kelly D. Hammett, Carla A. Schwartz, Siva S. Banda, IEEE Transactions on Control Systems Technology, vol. 4, No. 2, Mar. 1996.*

Word Recognition Using Neural Nets, Multi–State Gaussian and K–Nearest Neighbor Classifiers, David Lubensky, Accoustics, Speech, and Signal Processing, 1991. ICASSP–19., 1991 International Conference on 1991, pp. 141–144 vol. 1.*

On Neural–Network Implementations of k–Nearest Neighbor Pattern Classifiers, Yan Qui Chen, Robert I. Damper, Senior Member, IEEE, and Mark S. Nixon, IEEE Transactions on Circuits and Systerms–I: Fundamental Theory and Applications vol. 44, No. 7, Jul. 1997.*

A K–Nearest Neighbor Artificial Neural Network Classifier, Anil K. Jain, Jainchang Mao, Neural Networks, 1991., IJCNN–91–Seattle International Joint Conference on ii–1991, pp. 5150520 vol. 2.*

* cited by examiner

*Primary Examiner*—George B. Davis
*Assistant Examiner*—Michael B. Holmes
(74) *Attorney, Agent, or Firm*—H. Daniel Schnurmann (57) ABSTRACT

A method of achieving automatic learning of an input vector presented to an artificial neural network (ANN) formed by a plurality of neurons, using the K nearest neighbor (KNN) mode. Upon providing an input vector to be learned to the ANN, a Write component operation is performed to store the input vector components in the first available free neuron of the ANN. Then, a Write category operation is performed by assigning a category defined by the user to the input vector. Next, a test is performed to determine whether this category matches the categories of the nearest prototypes, i.e. which are located at the minimum distance. If it matches, this first free neuron is not engaged. Otherwise, it is engaged by assigning the matching category to it. As a result, the input vector becomes the new prototype with the matching category associated thereto. Further described is a circuit which automatically retains the first free neuron of the ANN for learning.

6 Claims, 5 Drawing Sheets

IMPLEMENTING AUTOMATIC LEARNING ACCORDING TO THE K NEAREST NEIGHBOR MODE IN ARTIFICIAL NEURAL NETWORKS

FIELD OF INVENTION

The present invention relates, generally, to neural networks and, more particularly, to a method and circuit for implementing automatic learning using the k nearest neighbor (KNN) mode (or algorithm) in artificial neural networks.

BACKGROUND OF INVENTION

Figure 1:
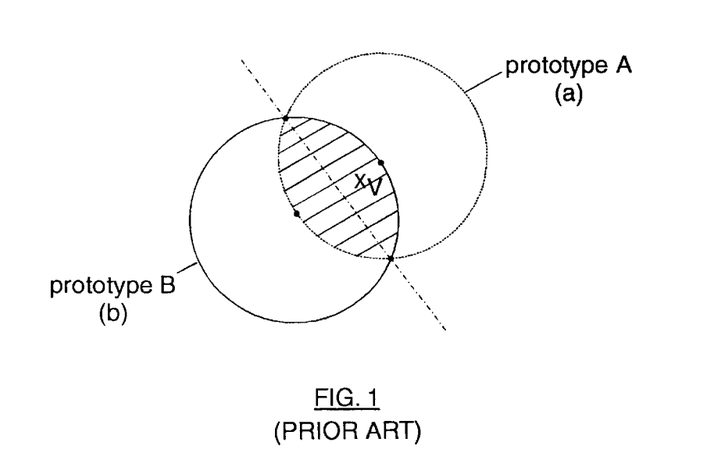
FIG. 1 shows two state-of-the-art prototypes having a common region of influence in a two dimensional feature space.

Artificial neural networks (ANNs) are used with increased frequency in applications where no mathematical algorithm can describe the problem to be solved. Moreover, they have proven to be highly successful in classifying and recognizing objects. ANNs give excellent results because they learn by example and are able to generalize in order to respond to an input vector that was never present before. Thus far, most ANNs have been implemented in software and only a few in hardware. When implemented in software, no automatic learning is possible. This is one of the reasons why the tendency to date is to implement ANNs in hardware, typically in semiconductor chips. In this case, hardware ANNs are generally based on an algorithm known in the art as Region of Influence (ROI). The ROI algorithm gives good results if the input vector presented to the ANN can be separated into classes of objects well segregated from each other. When an input vector is recognized by neurons belonging to two different classes (or categories), the ANN will respond with an uncertainty. By way of example, FIG. 1 shows two prototypes A and B with their respective actual influence fields (AIF) and categories 'a' and 'b' in a two-dimensional feature space. As apparent in FIG. 1, an input vector V falling in the hatched zone cannot be classified according to the ROI approach during the recognition phase because it is recognized by two prototypes that belong to different classes. In contradistinction to the K Nearest Neighbor (KNN) approach, an input vector V closer to prototype A will be assigned a class 'a'. When operating in a KNN mode, the uncertainty is limited to a line, as depicted in FIG. 1 instead of a surface, represented by the hatched zone.

Several neuron and artificial neural network architectures implemented in semiconductor chips are described in the following related patents:

U.S. Pat. No. 5,621,863 "Neuron Circuit", issued on Apr. 15, 1997 to Boulet et al.;

U.S. Pat. No. 5,701,397 "Circuit for Pre-charging a Free Neuron Circuit", issued on Dec. 23, 1997 to Steimle et al.;

U.S. Pat. No. 5,710,869 "Daisy Chain Circuit for Serial Connection of Neuron Circuits", issued on Jan. 20, 1998 to Godefroy et al.;

U.S. Pat. No. 5,717,832 "Neural Semiconductor Chip and Neural Networks Incorporated Therein", issued on Feb. 10, 1998 to Steimle et al.; and U.S. Pat. No. 5,740,326 "Circuit for Searching/Sorting Data in Neural Networks", issued on Apr. 14, 1998 to Boulet et al.;

all of which are incorporated herein by reference.

The ROI learning mode can be advantageously implemented in chips known as ZISC chips (ZISC is an IBM Corporation Trademark), because they incorporate a specific circuit, i.e., "Dmin determination circuit", also referred to as a "minimum circuit". Normally, the minimum circuit is designed to compute the minimum distance between the input vector and the prototypes stored in the neurons. Moreover, it is also adapted to identify which neuron computes the minimum distance.

The following description will be made in the light of the aforementioned U.S. patents, wherein the same terms and names of circuits will be kept whenever possible.

Several ZISC chips can be connected in parallel in order to reach the number of neurons needed for a given application defined by the user. All the neurons of the ANN compute the distance (e.g., the Manhattan distance) between the input vector to be recognized or learned and the prototypes stored in a Read/Write memory, typically a local RAM (Random Access Memory), implemented in each neuron.

Figure 2:
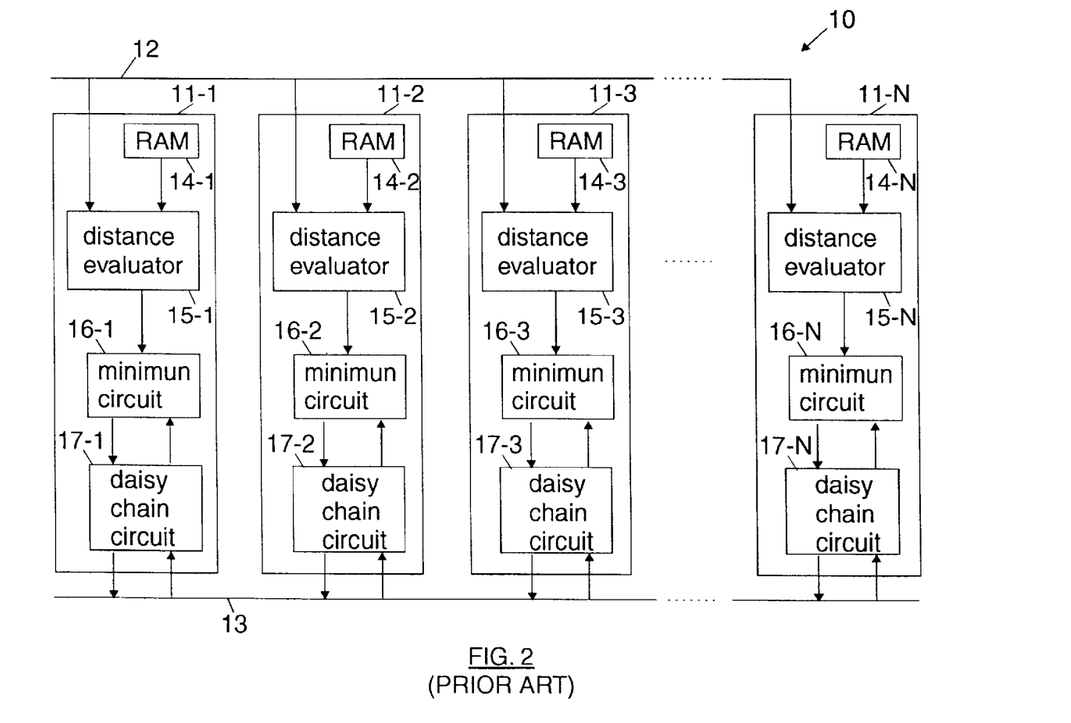
FIG. 2 schematically shows the essential elements of the state-of-the-art ZISC chip architecture, wherein a plurality of neurons are connected in parallel to form an artificial neural network (ANN) of a desired size.

FIG. 2 schematically shows a few neurons as part of an ANN, referenced 10, and which illustrates the essence of a conventional ZISC chip architecture. Referring more specifically to FIG. 2, neurons 11-1 to 11-N are fed in parallel by way of input bus 12 to enable communication with each other and with the external world. This is made possible through communication bus 13. The latter terminates at the chip boundary, namely, at open drain drivers to make it possible, by dotting all chips, to extend the neural network from the chip to a card. Let it be assumed that neurons 11-1 and 11-2 are the last two active (i.e., engaged) neurons of the ANN, and 11-3, the third neuron, is the first inactive (i.e., free) neuron thereof, i.e., not yet engaged by learning. As apparent from FIG. 2, the four main components of the neuron, e.g., neuron 11-1, are a local RAM 14-1 which stores the components of the prototype; a distance evaluator circuit 15-1 which computes the distance (e.g. the Manhattan distance) between the input vector and the prototype; a minimum circuit 16-1, which is required for ROI learning, as will be explained in more detail hereinafter and, finally, a daisy chain circuit 17-1, which is serially connected to two adjacent neurons chaining the neurons of the ANN. The daisy chain circuit in essential; or determining the neuron state, i.e., whether it is free or engaged.

Figure 3:
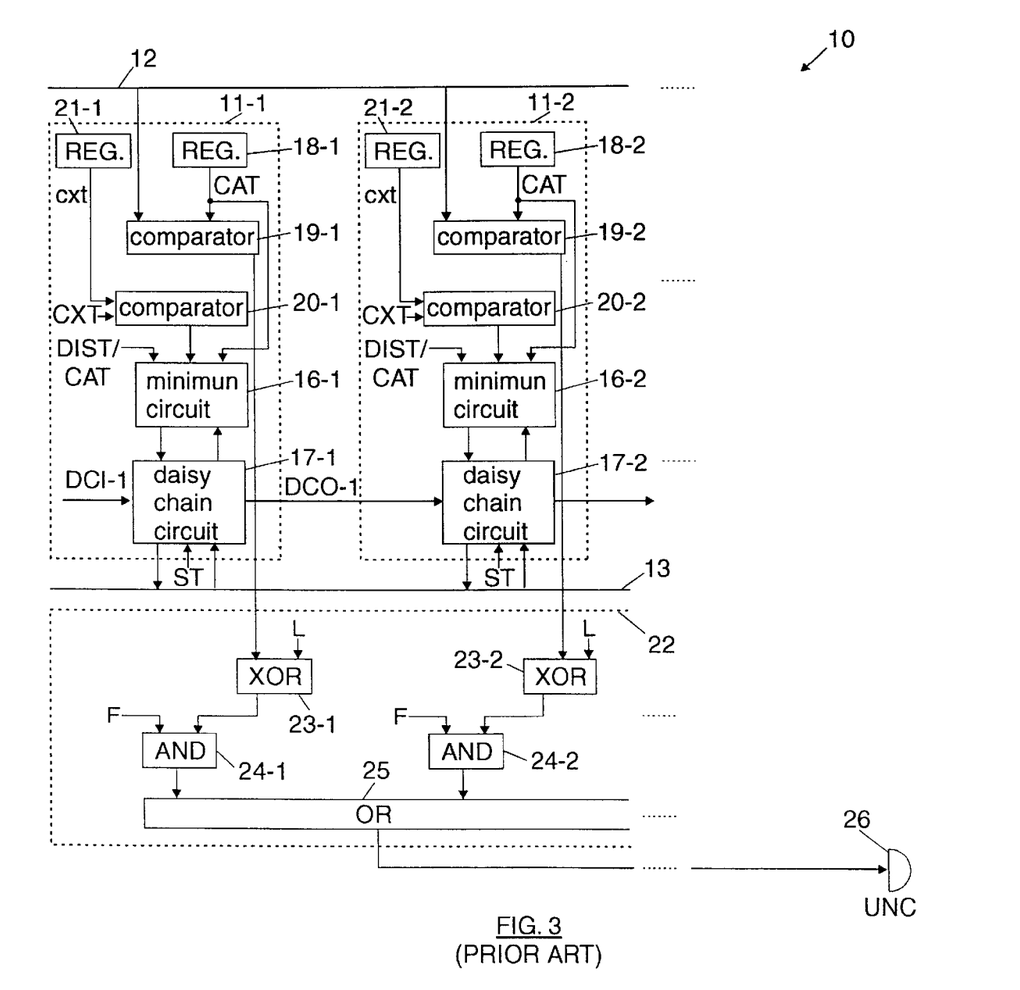
FIG. 3 shows the neurons of FIG. 2, wherein circuits that are dedicated to operate in the ROI mode are illustrated in more detail.

FIG. 3 shows the circuit of FIG. 2 limited to neurons 11-1 and 11-2, wherein only the elements that are dedicated to ROI learning (and recognition as well) are represented. Focusing now more particularly on neuron 11-1, register 18-1 (which is integral to the RAM 14-1 of FIG. 2) is dedicated to store the category CAT. Comparator 19-1 compares the category stored in register 18-1 with the incoming category on input bus 12 in the learning phase, or the category obtained by ORing all the categories of the neurons which have fired and which appeared initially on communication bus 13, and subsequently, on input bus 12 during the recognition phase. Comparator 20-1 compares the global context CXT to the neuron (or local) context CXT stored in register 21-1. Comparator 20-1 generates an output signal which enables the selection of the minimum circuit of the neurons whose local context matches the global context. More details regarding minimum circuit 16-1 and daisy chain circuit 17-1 may be found in U.S. Pat. No. 5,717,832 to Steimle et al. (e.g., box 500 in FIGS. 5 and 8 and their related description) and U.S. Pat. No. 5,710,869 to Godefroy et al. (e.g., box 150 in FIGS. 5 and 16 and their related description), respectively. Signal ST is applied to all the daisy chain circuits of the ANN. The first free neuron is the one which has DCI and DCO signals in a complementary state. This complementary state is detected by an exclusive-OR circuit.

As apparent from FIG. 3, there is shown a further circuit, bearing numeral 22, which corresponds to the identification circuit referenced 400 in FIGS. 5 and 25 of the aforementioned U.S. Pat. No. 5,717,832. The function of logic block 22 is to generate a signal UNC (UNC stands for UNCertain) which is activated when an input vector cannot be classified with certainty. Still considering neuron 11-1, the signal which is outputted from comparator 19-1 is applied to the first input terminal of 2-way XOR circuit 23-1 which receives the L signal (L stands for Learning) at the second input terminal. The output of the XOR circuit 23-1 is connected to a first input terminal of a 2-way AND gate 24-1 which receives the F signal (F stands for Fire) on its second input terminal. As apparent from FIG. 3, all the outputs of AND gates 24-1, 24-2, . . . of neurons 11-1, 11-2, . . . are connected to an N-way OR gate 25. The signal UNC mentioned above is generated by OR gate 25 and is available to the external logic circuit 22 on pad 26.

Still considering FIG. 3, the circuit operation during the recognition of an input vector when in the ROI mode will now be described. Two cases must be considered:

1) If only neurons belonging to the same category have fired (for these neurons 11, the fire signal F is F=1; for all others, F=0), the ORing operation (through their respective minimum circuits 16) between the values stored in their respective category register 18 will output the appropriate category on communication bus 13. Comparators 19, which compare the categories CAT held in registers 18 to the value appearing on bus 12 (previously present on bus 13) will generate a 0, the XOR circuits 23 outputs and the UNC signal will both be at 0. Therefore, when UNC=0 and F=1, the input vector is recognized.

2) If neurons belonging to different categories have fired, the ORing operation of these categories results in a different value for UNC. For these neurons, the outputs of comparator 19 will be at 1 and, consequently, the corresponding XOR circuits 23, AND gates 24 and signal UNC will, likewise, also be at 1. The condition UNC=1 and F=1 implies that the input vector was not recognized and that an uncertainty exists on the classification. To remove the uncertainty, a learning phase is required, i.e., a Write category operation must be performed by the user to engage the first free neuron. This operation which is time consuming, prevents automatic learning when operating in an ROI mode. As a matter of fact, the learning/recognition process can be significantly improved if the KNN algorithm was implemented in an ANN. As known to those skilled in the art, most applications give better results in the KNN mode, because admittedly it is more precise. Note that it would be also worthwhile to implement the KNN algorithm in combination with the ROI algorithm, because AIF could be advantageously used to raise the uncertainty mentioned above. Unfortunately, until now, there is no known method and circuit offering to a hardware ANN a fully automated KNN learning when operating in a KNN mode . Consequently, no efficient classification can be performed during the recognition phase of this mode, because the user needs an analysis step during the classification process to determine whether or not learning has been performed.

OBJECTS OF THE INVENTION

It is therefore a primary object of the present invention to provide a method and a circuit that allow implementing automatic learning according to the nearest neighbor (KNN) mode in an artificial neural network (ANN).

It is another object of the present invention to provide a method and a circuit that allow implementing automatic learning according to the nearest neighbor (KNN) mode (or algorithm) in an artificial neural network (ANN) in combination with the ROI algorithm to minimize the uncertainty that remains after the recognition phase.

It is still another object of the present invention to provide a method and a circuit that allow implementing automatic learning according to the nearest neighbor (KNN) mode in an artificial neural network (ANN), the circuit being derived from an identification circuit.

SUMMARY OF THE INVENTION

In a first aspect of the invention, there is provided a method for implementing the automatic learning of an input vector in an artificial neural network (ANN) based on a mapping of the input space according to the K nearest neighbor mode (KNN) comprising the steps of: providing a plurality of neurons forming the ANN, wherein at least one neuron is free (not engaged); presenting the input vector to be learned to the ANN and proceeding to a Write component operation to store the input vector components in the first available free neuron of the ANN; assigning the category defined by the user to that input vector by performing a Write category operation; testing whether this category is the same as the categories of the closest prototypes (i.e. located at the minimum distance) stored in neurons previously engaged: if it is the same, the first free neuron is not engaged; if it is not, the first free neuron is engaged so that the input vector becomes a new prototype with the defined category associated thereto.

According to another aspect of the present invention, an automatic KNN learning mode can be advantageously implemented in hardware using, e.g., ZISC chips, wherein only a limited number of changes in the identification circuit are necessary for integrating the automatic KNN learning mode, in addition to the existing ROI learning mode.

BRIEF DESCRIPTION OF THE DRAWINGS

The novel features believed to be characteristic of this invention are set forth in the appended claims. The invention itself, however, as well as these and other objects, aspects and advantages thereof, will be best understood by reference to the following detailed description of an illustrated preferred embodiment to be read in conjunction with the accompanying drawings.

DESCRIPTION OF A PREFERRED EMBODIMENT

Figure 4:
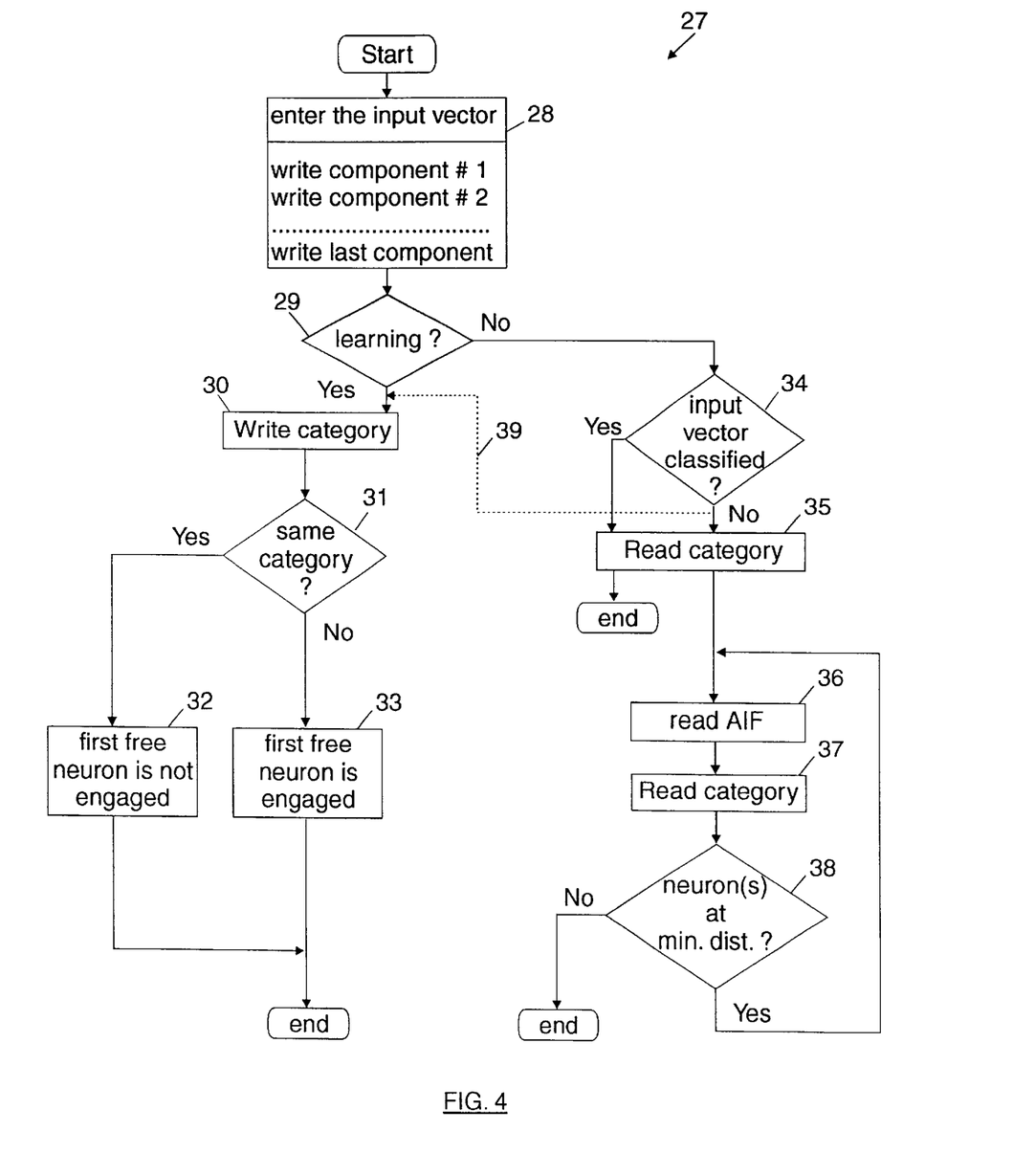
FIG. 4 is a flowchart showing the essential steps of the method of implementing the automatic KNN learning in an artificial neural network, according to the present invention.

FIG. 4 is a flowchart referenced 27 showing the essential steps of the method of implementing the automatic KNN learning in an artificial neural network, such as the ANN incorporated in ZISC chips, according to the present invention. For illustration purposes, only the essential steps of the recognition process are shown in FIG. 4. However, since they are considered as state-of- the-art per se, they will be only briefly discussed.

Assuming that the existence of at least one free neuron has been checked. Turning to FIG. 4, the learning phase in the KNN mode is initiated by entering the input vector to be learned in the ANN. In essence, it consists in performing a 'Write components operation', i.e., entering all the components of the input vector in the Read/Write memory of the first free neuron (step 28). It may be noticed that this step is common to both the learning and to the recognition modes. Therefore, a test must be conducted to determine whether the following processing applies to the learning or to the recognition phase (step 29). When KNN learning is performed using a classical software based methodology (a similar situation occurs in the ROI learning, as mentioned above), it is mandatory at this stage to determine whether or not the input vector has been recognized. This determination usually requires a number of additional processing operations to set a dedicated bit at a value that shows that the input vector has been classified (or identified). This is achieved by determining if it is contained within the region of influence of a prototype stored in memory. This time consuming operation is no longer required in the present invention thanks to the specific circuit shown in FIG. 5. Consequently, a fully automated KNN learning is now possible. Alternatively, it is not necessary to guarantee that the input vector is correctly classified by determining if the closest prototype belongs to the same category or to a different category, or if the input vector was not classified altogether, i.e., the input vector is the closest neighbor of at least two prototypes belonging to different categories.

Let it be assumed that the process operates in the learning phase. A Write category operation is now performed to assign a category to the input vector loaded in the first free neuron, as mentioned above (step 30). A new test must now determine whether this category is the same as the categories of the closest prototypes, i.e., at the minimum distance (step 31). If the answer is 'yes', i.e., a neuron at the minimum distance belongs to the same category, and the free neuron in consideration does not need to be engaged (step 32) Otherwise (if the answer is 'no'), the category inputted during step 30 is different from at least one category of the neurons at the closest distance, and the free neuron in consideration needs to be engaged (step 33). In both instances, the learning process terminates. Therefore, all the above operations relative to the neuron engagement are fully automated.

Regarding the recognition process, the input vector is entered in the same manner as previously described with respect to the learning process (step 28). Then, a test is performed to ascertain that the input vector has been classified (step 34). If it has, a Read category operation is performed (step 35) and the recognition process is terminated. If not, three Read operations are conducted: reading the category (step 35), AIF (step 36), and a second time, the category (step 37). This sequence is necessary because of the existence of at least two neurons with different categories at the minimum distance. AIF is read to chose between categories of the closest neurons and determine the category of neuron having the greatest AIF. As mentioned above, AIF which is a typical parameter of the ROI algorithm, is exploited in the KNN during the recognition phase mode for increased accuracy. A final test then takes place to determine whether there still remains neurons at the minimum distance. If the answer is negative, the recognition phase is deemed completed. If the answer is positive, steps 36 and 37 need to be repeated until all the neurons have been read.

The algorithm depicted in FIG. 4 is highly efficient in that it allows for a fast and automatic learning. Moreover, it allows learning 'on-the-fly'. During the recognition phase, once the ANN has been trained and not all neurons of the ANN have been engaged, the user can improve the ANN classification at any time by performing a Write operation if the ANN response was unclassified (see the dotted line bearing numeral 39 in FIG. 4). The algorithm of FIG. 4 can be implemented on ZISC chips at the cost of only a few circuit modifications.

Figure 5:
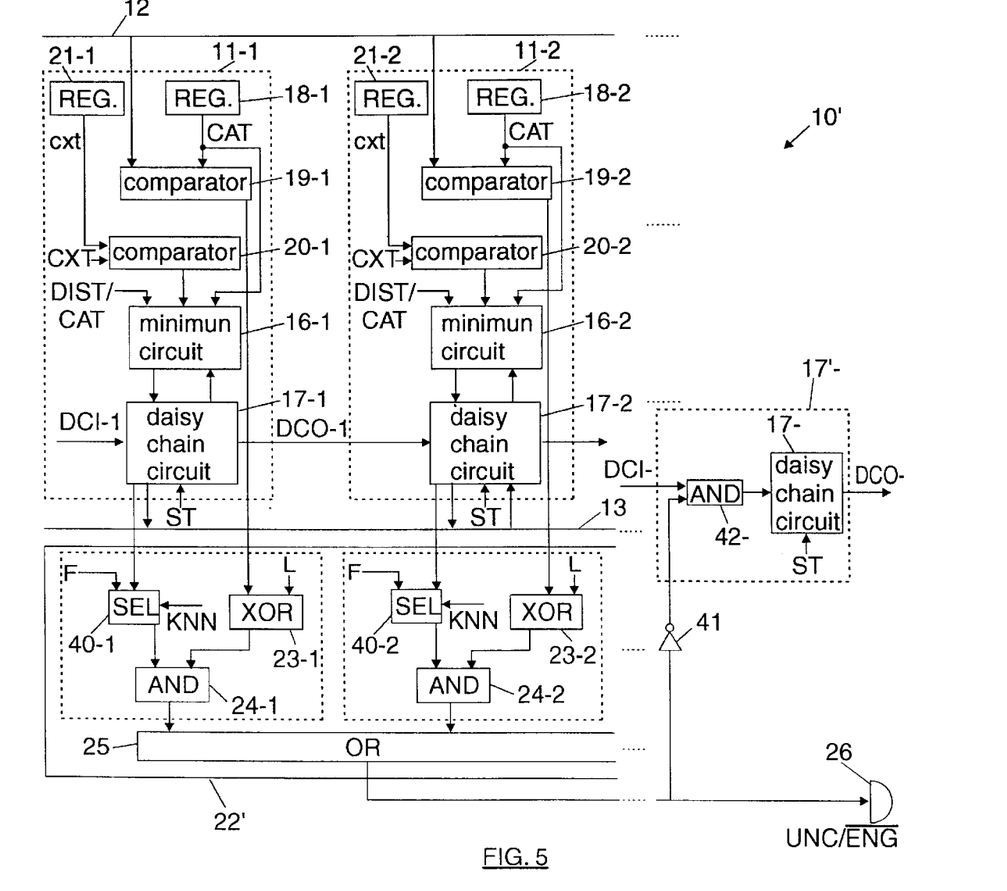
FIG. 5 shows the circuit of FIG. 3 once modified to add the automatic KNN learning mode to the existing ROI mode, according with the present invention.

Now turning to FIG. 5, there is shown the new circuit referenced 10 wherein the prior art circuit of FIG. 3 has been modified to allow performing an automatic KNN learning, as defined by the algorithm depicted in FIG. 4, in addition to the ROI learning already implemented in ZISC chips. Note that the logic block is now referenced 22. Only the minimum circuits 16 with a comparator 20 output at 0 are selected to participate in the minimum distance search between neurons. The logic gates inside block 22 are now capable of performing the recognition and learning phases in both ROI and KNN modes. In logic block 22, a selector 40 controlled by signal KNN is added thereto to select either the local neuron F (fire) signal in the ROI mode (KNN=0) or the minimum circuit 16 output for the KNN mode (KNN=1). To make the learning automatic, inverter 41 (common to all neurons) and AND gate 42 (in each neuron) are added externally to each conventional daisy chain circuit 17. The improved daisy chain circuit now consists of inverter 41 and circuit referenced 17 resulting from the combination of AND gate 42 and conventional daisy chain circuit 17. As apparent in FIG. 5, the signal available at pad 26 is now labeled UNC/ENG to emphasize that this signal will be now able to engage the first free neuron.

The operation of the circuit of FIG. 5 in KNN mode (KNN signal=1) will now be considered next. In the recognition phase, as soon as an input vector is presented to the ANN, the categories of the selected neurons, i.e., the neurons with the minimum distance (in the ROI approach, the selected neurons would have been those which have fired) are ORed through minimum circuit 16, and the resulting value is compared to the category CAT stored in register 18 by comparator 19. If the selected neurons belong to the same category, the ORing result will also belong to the same category, and the comparator 19 will have its output at 0. In this case, the XOR 23 output will be at 0 (in recognition L=0) and the outputs of AND gate 24 and OR gate 25 at 0). Therefore, UNC/ENG=0 and the input vector is classified. If the selected neurons belong to different categories, the ORing result will be different from all other CAT categories and the output of comparator 19 will be at 1. In this case, the output of XOR 23 will be at 1, and the outputs of AND gate 24 and OR gate 25 will be at 1. In this case, UNC/ENG=1 and the classification is deemed uncertain.

In the first case, no learning process is required unlike the second case wherein the learning process needs to be performed to improve the classification. In fact, with circuits 41 and 17, the learning is fully automatic, which means that the user does not have to determine whether the classification is or not uncertain; the user needs just to perform the Write category operation. Regardless, logic block 22 itself decides whether the first free neuron should be engaged or not. This is the case of the aforementioned learning 'on-the-fly'.

During the learning process, the L signal of XOR gate 23 is at 1 and the category presented to the input bus is compared to the local category CAT by comparator 19. If the category of the input bus is the same as the category of the selected neuron, the output of comparator 19 is at 0, and the outputs of XOR gate 23, AND gate 24 and OR gate 25 are at a 1. Thus, UNC/ENG=1, and the outputs of inverter 41 and AND gate 42 are at 0. The daisy chain circuit 17 is loaded with a 0 and the first free neuron is not engaged. On the contrary, if the category on the input bus is not the same as the CAT category of a selected neuron, the output of comparator 19 is at 1, and the outputs of XOR gate 23, AND gate 24 and OR gate 25 are at 0. Accordingly, UNC/ENG=0, and the inverter 41 and the output of AND gate 42 outputs are at 1. The daisy chain circuit 17 is loaded with a 1 and, as a final result, the first free neuron is engaged.

To summarize, the learning is completely automated, which means that the user does not to have to know if the input vector has been classified (recognized) before performing the Write category operation (step 30 in FIG. 4). The logic block 22 (via inverter 41 and AND gate 42) controls the engagement of the first free neuron by loading a 1 in the corresponding daisy chain circuit 17 by default. On the other hand, it also allows to inhibit this default engagement by activating the output of OR gate 25 in the case of an incoming category been seen as one of the nearest. The function of circuit 40 in logic block 22 is to select the neurons which give the minimum distance.

Figure 6:
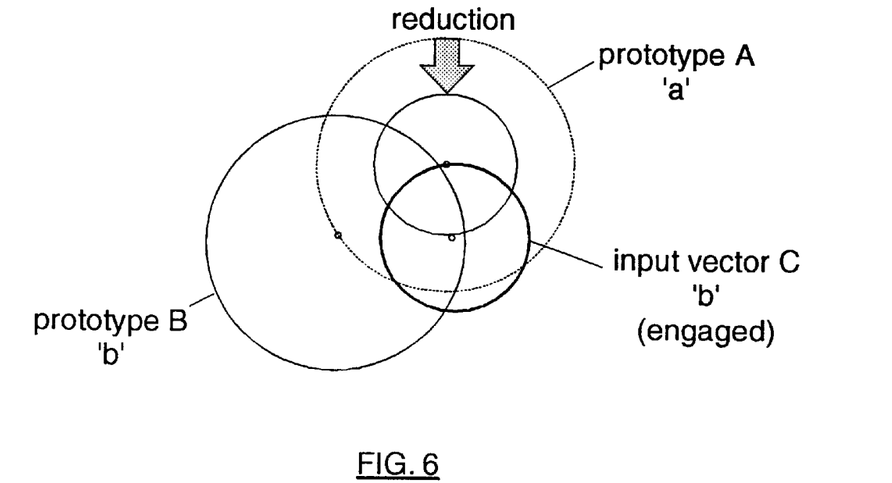
FIG. 6 shows a case wherein the input vector presented to the ANN has a category different to the one of the closest prototype among two prototypes previously memorized in the ANN, thereby necessitating the engagement of a new neuron (the first free).

FIG. 6 illustrates the normal case, which is the most of ten encountered. Therein are illustrated two prototypes memorized in the ANN: a prototype A (CAT: a) and a prototype B (CAT: b). Let it be assumed that an input vector C with a category b is presented to the ANN. Then, the nearest prototype to the input vector C is given by prototype A which has a different category 'a'. It is thus necessary to engage a free neuron to store this input vector as a new prototype with its category 'b'. In addition, AIF of prototype A has been reduced. AIF is not an essential parameter for the KNN mode during the learning, but it may be sometimes useful to know if a neuron is far or close to its neighbors.

Figure 7:
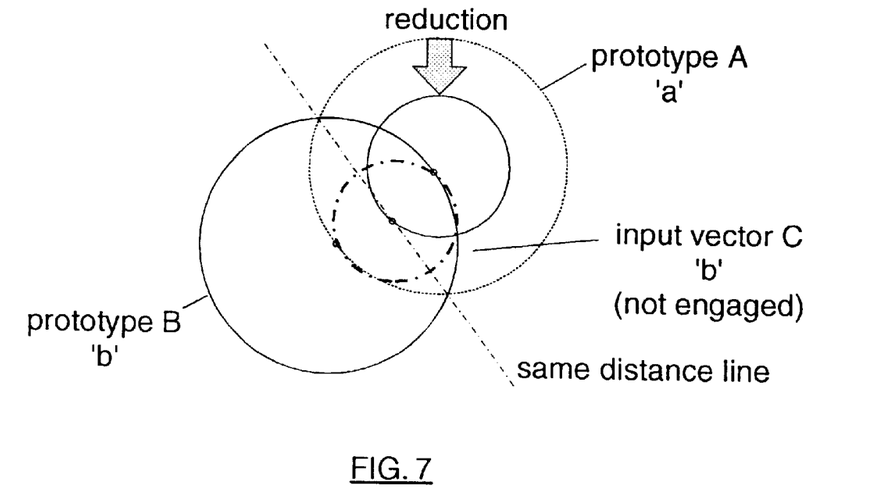
FIG. 7 shows a situation similar to the one depicted in FIG. 6, but in this case, a new neuron is not engaged.

FIG. 7 shows the case where the two prototypes A (CAT: a) and B (CAT: b) are at the same minimum distance of the input vector C (CAT: b). By reducing AIF of prototype A, the input vector is recognized by prototype B which has the same category 'b'. No neuron will be engaged in this case. Note that in this case, the ROI mode is very useful to remove the uncertainty when the input vector is located on the same distance line.

Whereas the present invention has been described in terms of a preferred embodiment, those skilled in the art will readily recognize that various changes and modifications may be made both to the steps required by the method or to the circuits forming the hardware without departing from the scope and the spirit of the invention.

What is claimed is:

1. A method for achieving automatic learning of an input vector in an artificial neural network (ANN) based on mapping an input space according to a K nearest neighbor mode (KNN), comprising the steps of:

providing a plurality of neurons forming the ANN, wherein at least one neuron is free;

providing to the ANN the input vector to be automatically learned and storing components of the input vector in the first ANN free neuron by performing a Write component operation;

assigning a predetermined category to the input vector by performing a Write category operation; and testing whether the predetermined category matches the category of prototypes located within a predefined distance of neurons previously engaged, wherein if a match occurs, the first free neuron is not engaged;

otherwise, the first free neuron is engaged such that the input vector becomes the new prototype having the category associated thereto.

2. A method for achieving automatic learning in an artificial neural network (ANN) based on mapping an input space according to the K nearest neighbor mode (KNN) during recognition of an input vector, the method comprising the steps of:

providing a plurality of neurons forming the ANN, wherein at least one neuron is not engaged;

providing to the ANN an input vector to be classified;

storing components of the input vector in the first neuron that is not engaged by performing a Write component operation;

testing if the input vector has been classified, wherein if it is not classified, proceeding to performing automatic learning "on the fly", comprising the steps of:

assigning to the input vector a predetermined category by performing a Write category operation; and testing whether the predetermined category matches the category of prototypes located within a predefined distance of neurons previously engaged, wherein if a match occurs, the first free neuron is not engaged;

otherwise, the first free neuron is engaged and the input vector becomes the new prototype with the predetermined category associated thereto.

3. In an artificial neural network (ANN) formed by a plurality of neurons organized as a chain adapted to operate in a region of influence (ROI) mode and interconnected via input and output buses, wherein data appearing on the output bus becomes available to the input bus, each neuron within the ANN comprising:

first memory means for storing components of an input vector provided to the ANN;

second memory means for storing a predetermined category of the input vector;

means for comparing an incoming category on the input bus to the category stored in the second memory means;

computing means for determining a minimum distance between the input vector and prototypes previously stored in the remaining neurons of the ANN;

the daisy chain having a register for identifying the state of the neuron, the neurons being classified as: 'first free neuron', and 'engaged neuron', dependent on the logic state of its corresponding input and output signals and the content of the register, wherein a logic means including a daisy chain circuit in each neuron is connected to the daisy chain circuits of two adjacent neurons performing automatic learning according to the K nearest neighbor (KNN) mode; the logic means controlling the engagement of the first free neuron by loading a logic value in the daisy chain circuit by default and by inhibiting the defaulted engagement in case the incoming category is one of the categories that belong to the prototypes located at the minimum distance.

4. The artificial neural network of claim 3 wherein the logic means is controlled by an enable signal (KNN) to implement the KNN mode.

5. The artificial neural network of claim 4 wherein the logic means comprises:

a logic block in each neuron generating an identification signal for identifying when a prototype located at the minimum distance belongs to the same category as the incoming category;

an OR circuit common to all the neurons of the ANN for ORing all the identification signals outputted by the logic block;

an inverter common to all the neurons of the ANN connected to the output of the OR circuit; and a daisy chain circuit comprising:

an AND gate for ANDing the signal outputted by the inverter and the daisy chain input signal (DCI);

a daisy chain circuit for identifying the state (free, first free or engaged) of the neuron depending on logic values of its input and output signals, wherein its input signals are signals generated by the AND gate.

6. The artificial neural network of claim 5 wherein a correspondence between the logic state of the neuron and the input and output signals is governed by the conditions:

| INPUT SIGNAL | OUTPUT SIGNAL | NEURON STATE |
|---|---|---|
| DCI = H (high) | DCO = L (low) | first free neuron |
| DCI = H | DCO = H | engaged |
| DCI = L | DCO = L | free |

* * * * *